(12) United States Patent
Pahlevaninezhad et al.

(10) Patent No.: US 11,984,727 B2
(45) Date of Patent: May 14, 2024

(54) MULTI-LEVEL CURRENT DRIVEN DC/DC CONVERTER

(71) Applicant: SPARQ SYSTEMS INC., Kingston (CA)

(72) Inventors: Majid Pahlevaninezhad, Kingston (CA); Praveen Jain, Kingston (CA)

(73) Assignee: SPARQ SYSTEMS INC., Kingston (CA)

( * ) Notice: Subject to any disclaimer, the term of this patent is extended or adjusted under 35 U.S.C. 154(b) by 0 days.

(21) Appl. No.: 17/896,715

(22) Filed: Aug. 26, 2022

(65) Prior Publication Data
US 2024/0072545 A1 Feb. 29, 2024

(51) Int. Cl.
*H02J 3/38* (2006.01)
*H02M 3/335* (2006.01)

(52) U.S. Cl.
CPC ......... *H02J 3/381* (2013.01); *H02M 3/33507* (2013.01); *H02M 3/33569* (2013.01); *H02J 2300/24* (2020.01)

(58) Field of Classification Search
CPC .. H02J 3/381; H02J 2300/24; H02M 3/33507; H02M 3/33569
USPC .......................................................... 307/82
See application file for complete search history.

(56) References Cited

U.S. PATENT DOCUMENTS

| 11,309,832 B2* | 4/2022 | Adest | H01L 31/02021 |
| 2016/0065081 A1* | 3/2016 | Raju | H02M 3/33571 |
| | | | 29/602.1 |
| 2019/0052177 A1* | 2/2019 | Lu | H02M 7/797 |
| 2019/0386572 A1* | 12/2019 | Itoh | H02M 1/40 |

* cited by examiner

*Primary Examiner* — Hal Kaplan
(74) *Attorney, Agent, or Firm* — Brion Raffoul

(57) ABSTRACT

A DC/DC converter and a microinverter architecture using the DC/DC converter are disclosed. The DC/AC inverter is based on a differential geometry control scheme to balance and optimize the flying capacitor voltages across the flying capacitors used in the converter. Based on overall system conditions, including flying capacitor voltages, converter output voltages, input current, and input voltage, desired fields are generated. These fields are used to balance capacitor voltages such that capacitor voltage values converge, over time, to an optimal solution.

13 Claims, 19 Drawing Sheets

MULTI-LEVEL CURRENT DRIVEN DC/DC CONVERTER

TECHNICAL FIELD

The present invention relates to power conversion. More specifically, the present invention relates to multi-level current driven DC/DC converters inverters that use a differential geometry based control scheme and microinverters that use such DC/DC converters.

BACKGROUND

There is a growing number of photovoltaic (PV) applications where direct current/alternating current (DC/AC) inverters are required to provide maximum power point tracking (MPPT) to harvest maximum solar energy from PV panels. The harvested energy is then fed as clean AC electricity into the power grid. In solar energy harvesting systems, a DC/AC inverter is used as the interface to the utility grid in various configurations. The grid-connected DC/AC inverter plays a crucial role in the performance and reliability of the solar energy harvesting systems.

There are several power architectures used for solar energy harvesting systems. FIG. 1 is the block diagram of a solar energy harvesting system with string inverters according to the prior art. As can be seen in FIG. 1, a string of Photovoltaic (PV) panels are placed in series to create a high DC voltage (~400V). A string inverter is then used to convert the DC power into AC power compatible with the grid and/or local loads. The main issue with this configuration is performance degradation due to partial shading. If one of the PV panels is shaded, the power generation of the entire string is compromised since the PV panels are connected in series. Also, the PV panels may have different maximum power points due to various reasons such as manufacturing tolerances, etc. Thus, the string inverter cannot guarantee maximum power point tracking (MPPT) for each individual panel and thus cannot guarantee the achievement of maximum energy harvesting from the solar energy system. In order to address the above issues, other architectures were introduced.

FIG. 2 shows an exemplary arrangement of architectures according to the prior art. As can be seen in FIG. 2, DC optimizers are used on the PV side to individually control each PV panel. The outputs of the DC optimizers are coupled in series to create a high DC voltage for the DC/AC inverter. This approach solves the issue of partial shading and provides individual MPPT for each PV panel. However, since the DC optimizers are placed in series, a minimum number of PV panels in a string are needed to be operational to build up enough voltage for the inverter. Also, roof planning may be needed to accommodate this minimum number of panels per string and to thereby ensure system reliability. In order to address some of these issues, DC optimizers that are coupled in parallel are introduced. Such as system according to the prior art is illustrated in FIG. 3.

FIG. 4 shows another architecture according to the prior art. In this architecture, termed as a microinverter, the complete DC to AC power conversion is performed by the microinverter. As can be seen in FIG. 4, the microinverter usually includes a DC/DC converter on the PV side. The DC/DC converter is provided to boost the voltage and to provide galvanic isolation. Also included in the microinverter is a DC/AC inverter. The DC/AC inverter is provided to convert DC power into AC power that is compatible with the grid and/or local loads. Microinverters can provide individual MPPT for each panel and do not require any roof planning since they are placed in parallel with the AC grid side. In order to increase the power capability of microinverters, a quad structure for the microinverter has been introduced. Such an architecture according to the prior art is shown in FIG. 5. Since four PV panels meet at a common connection point, the quad architecture is well-suited for increasing the power density of the system and for providing high performance for the solar energy harvesting system.

Typically, in most of the above architectures, the DC voltage across the PV panels should be boosted for the DC/AC inverter. Commonly, a DC/DC converter is used to boost the PV voltage. This DC/DC converter performs the maximum power point tracking for the PV panel and can also provide galvanic isolation for safety reasons. One of the main challenges related to this DC/DC converter is the large range of PV voltage/current values. As an example, the voltage can vary from 18V to 65V for a typical PV panel. The output voltage of the DC/DC converter (i.e., the DC-bus voltage) can also have a large amount of ripple particularly in single-phase systems. In single-phase systems, there will be significant amount of voltage ripple due to the double frequency power ripple caused by the DC to AC power conversion. Similarly, the ripple can also be high in unbalanced three-phase systems. FIG. 6 shows a commonly used power circuit topology used for this application in the prior art. The power circuit topology in FIG. 6 is called an LLC resonant converter. Because the LLC resonant converter provides a decent range of gains and soft switching, this circuit is a suitable option for this application. However, the performance of the LLC converter degrades significantly for applications with a wide range of operating conditions. For clarity, solar energy harvesting systems have a very wide range of operating conditions.

In order to address some of the difficulties related to LLC resonant converters, current-driven DC/DC converters according to the prior art have been introduced. A typical power circuit topology for a current-driven DC/DC converter according to the prior art is shown in FIG. 7. This topology is a non-resonant type that can provide high efficiency and high power density. However, its performance cannot be optimized over a large range of operating conditions.

Based on the above, there is therefore a need for systems and devices which mitigate if not avoid the shortcomings of the prior art.

SUMMARY

The present invention provides a DC/DC converter and a microinverter architecture using the DC/DC converter. The DC/AC inverter is based on a differential geometry control scheme to balance and optimize the flying capacitor voltages across the flying capacitors used in the converter. Based on overall system conditions, including flying capacitor voltages, converter output voltages, input current, and input voltage, desired fields are generated. These fields are used to balance capacitor voltages such that capacitor voltage values converge, over time, to an optimal solution.

In a first aspect, the present invention provides a microinverter system for receiving input DC power and for producing AC power suitable for an AC power grid, the system comprising:
 a plurality of multi-level current driven DC/DC converters, each of said plurality of DC/DC converters receiving said input DC power from DC power sources;

a DC/AC inverter receiving outputs of said plurality of DC/DC converters and producing said AC power, an output of said DC/AC inverter being received by said AC power grid;
a differential geometric control system for controlling said DC/AC inverter and for controlling said plurality of DC/DC converters;
wherein said control system controls each of said plurality of DC/DC converters to perform maximum power point tracking to extract maximum input DC power from said DC power sources.

In a second aspect, the present invention provides a DC/DC converter comprising:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of said flying capacitors, each flying capacitor being associated with a specific pair of circuit element modules;
a pair of input capacitors coupled in series to each other;
an input inductor;
two pairs of diodes, each pair of diodes being coupled in series;
a first output capacitor and a second output capacitor;
wherein
each of said plurality of circuit element modules is coupled in series to other circuit element modules to form a chain of circuit element modules;
each flying capacitor is coupled between a first coupling point and a second coupling point in said chain of circuit element modules and each flying capacitor and each pair of circuit element modules are arranged in said chain such that for each specific flying capacitor, a specific pair of circuit element modules associated with said specific flying capacitor is coupled in said chain between a specific first coupling point and a specific second coupling point between which said specific flying capacitor is coupled;
and wherein
on said primary side of said transformer, said DC/DC converter comprises:
said pair of input capacitors being coupled in parallel to said chain;
said input inductor is coupled between a first end of said transformer primary side and a first coupling point that is in a middle of said chain;
a second end of said transformer primary side is coupled to a second coupling point that is between said pair of input capacitors;
an input is coupled in parallel to said pair of input capacitors;
on said secondary side of said transformer, said DC/DC converter comprises:
said first output capacitor being coupled between a first end of said transformer secondary side and a second end of said transformer secondary side;
said two pairs of diodes being coupled in parallel to each other;
said second output capacitor being coupled in parallel with said two pairs of diodes;
said first end of said transformer secondary side being coupled to a first output coupling point that is between said first pair of diodes;
said second end of said transformer secondary side being coupled to a second output coupling point that is between said second pair of diodes;
wherein said DC/DC converter further comprises a controller for controlling capacitor voltages for said plurality of flying capacitors, the controller comprising:
an MPPT controller for implementing maximum power point tracking on said converter and for producing a reference voltage;
a multivariable controller for receiving said reference voltage, flying capacitor voltages from said plurality of flying capacitors, and an output voltage of said converter, said multivariable controller producing switching frequency values and duration values for said switching frequency values;
a high frequency (HF) current modulator receiving said switching frequency values, said duration values, and a transformer current for said transformer, said current modulator producing switching pulses for semiconductors in said plurality of circuit element modules.

In a third aspect, the present invention provides a current driven DC/DC converter comprising:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of said flying capacitors, each flying capacitor being associated with a specific pair of circuit element modules;
an input capacitor;
an input inductor;
two pairs of diodes, each pair of diodes being coupled in series;
a first output capacitor and a second output capacitor;
wherein
each of said plurality of circuit element modules is coupled in series to other circuit element modules to form a first chain of circuit element modules and a second chain of circuit element modules, said first chain being coupled in parallel with said second chain;
for both of said first chain and said second chain, each flying capacitor is coupled between a first coupling point and a second coupling point in said first or second chain of circuit element modules and each flying capacitor and each pair of circuit element modules are arranged in said first chain or said second chain such that for each specific flying capacitor, a specific pair of circuit element modules associated with said specific flying capacitor is coupled in said first chain or said second chain between a specific first coupling point and a specific second coupling point between which said specific flying capacitor is coupled;
wherein
on said primary side of said transformer, said DC/DC converter comprises:
said first chain of circuit element modules and said second chain of circuit element modules;
said input capacitor being coupled in parallel with both of said first chain and said second chain
said input inductor being coupled between a first end of said transformer primary side and a first coupling point that is in a middle of said first chain a second end of said transformer primary side being coupled to a second coupling point that is in a middle of said second chain on said secondary side of said transformer, said DC/DC converter comprises:

said two pairs of diodes;

said first output capacitor and said second output capacitor;

said first output capacitor being coupled between a first end of said transformer secondary side and a second end of said transformer secondary side;

said second output capacitor being coupled in parallel with said two pairs of diodes;

said first end of said transformer secondary side being coupled to a first output coupling point that is between said first pair of diodes;

said second end of said transformer secondary side being coupled to a second output coupling point that is between said second pair of diodes;

wherein said DC/DC converter further comprises a controller for controlling capacitor voltages for said plurality of flying capacitors, the controller comprising:

an MPPT controller for implementing maximum power point tracking on said converter and for producing a reference voltage;

a differential geometric controller block for receiving said reference voltage, flying capacitor voltages from said plurality of flying capacitors, and an output voltage of said converter, said differential geometric controller block producing desired vectors based on said reference voltage, said flying capacitor voltages, and said output voltage;

a high frequency (HF) current controller for receiving said reference voltage and an input voltage and for producing a threshold current signal;

a high frequency current geometric modulator for receiving said desired vectors, said threshold current signal, and a transformer current, said current geometric modulator producing switching pulses for semiconductors in said plurality of circuit element modules.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
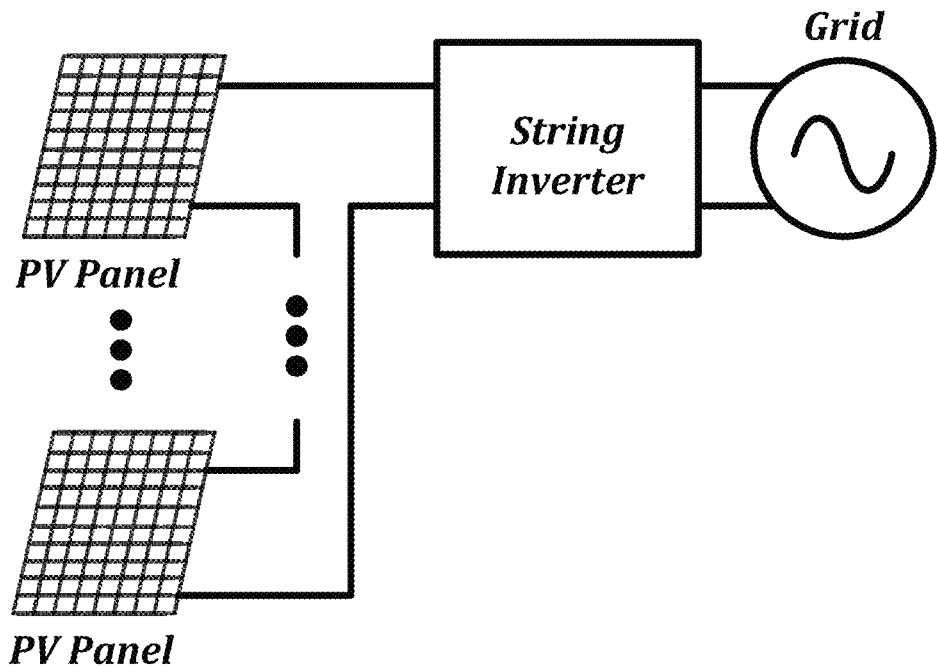
FIGS. 1-7 are block diagrams of systems and circuits according to the prior art.
Figure 2:
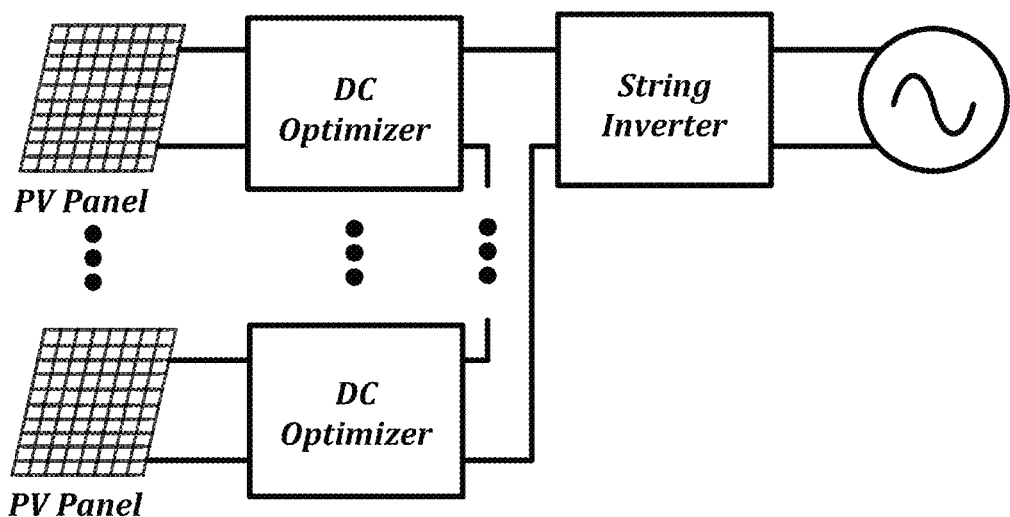
Figure 3:
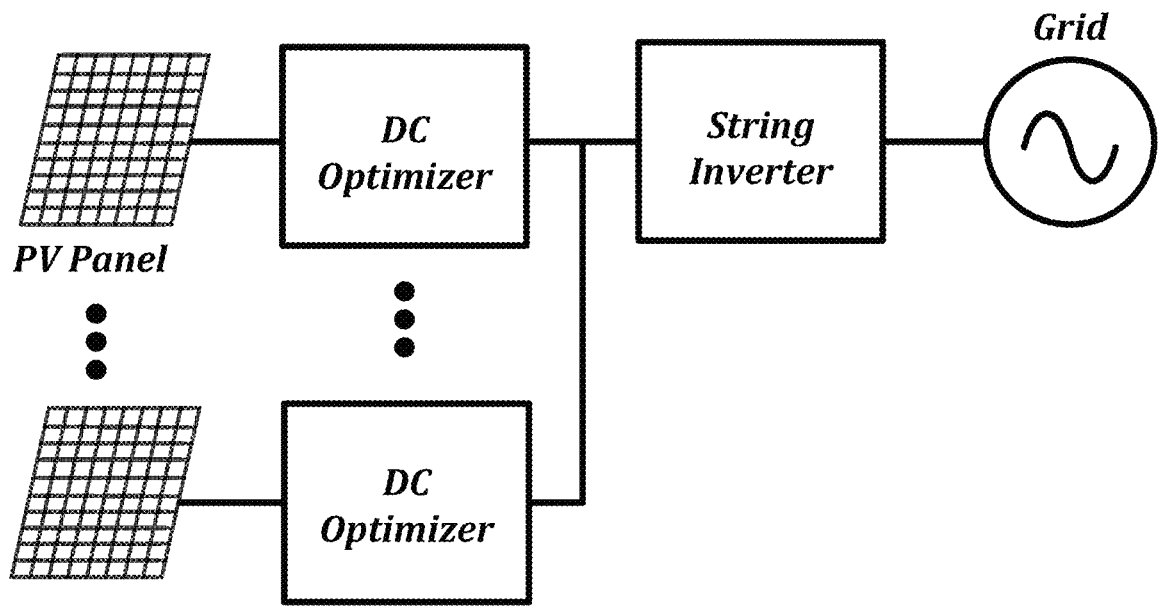
Figure 4:
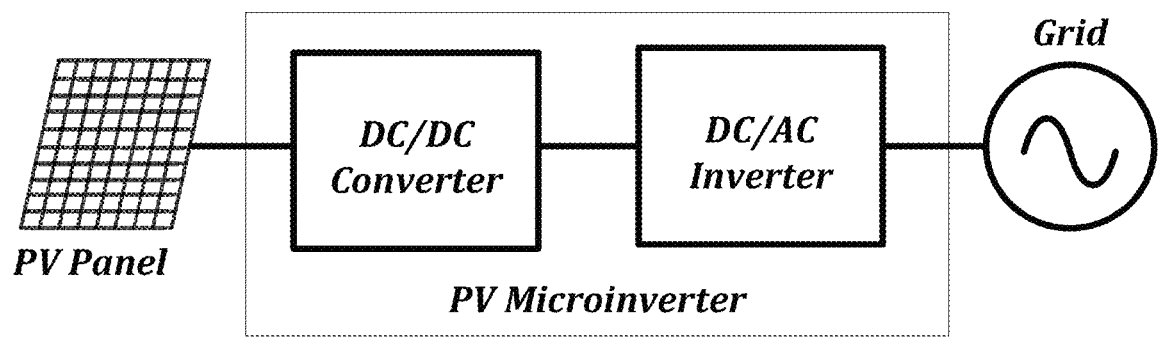
Figure 5:
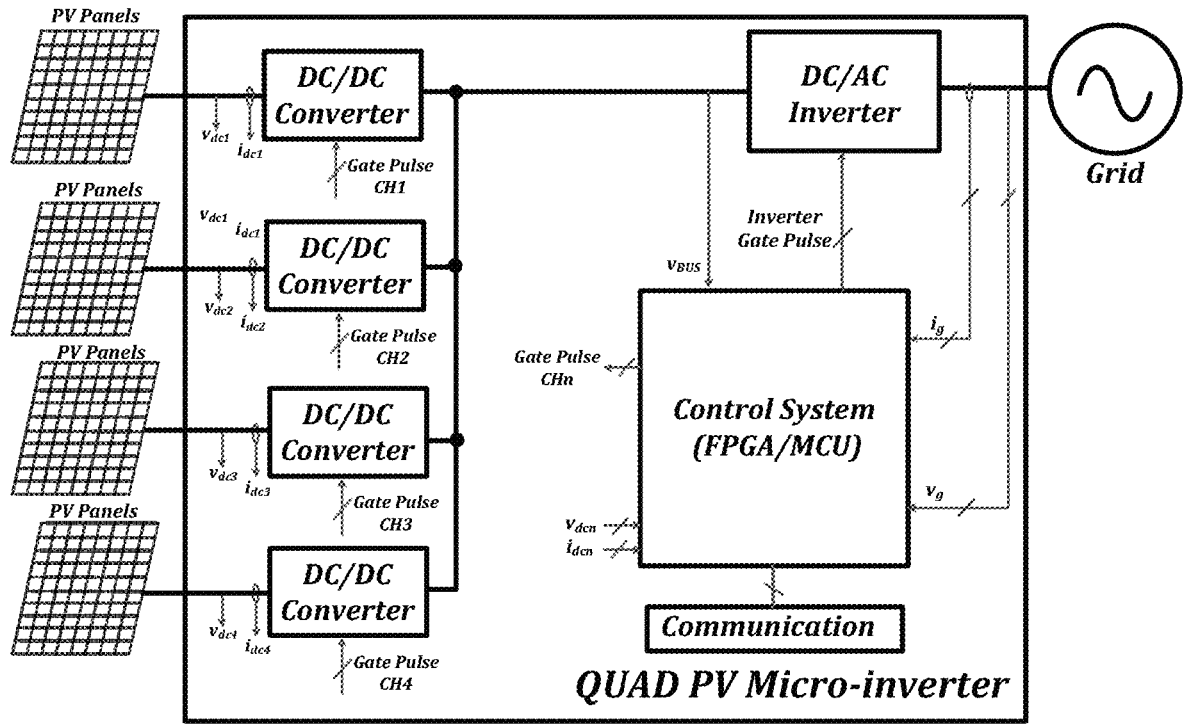
Figure 6:
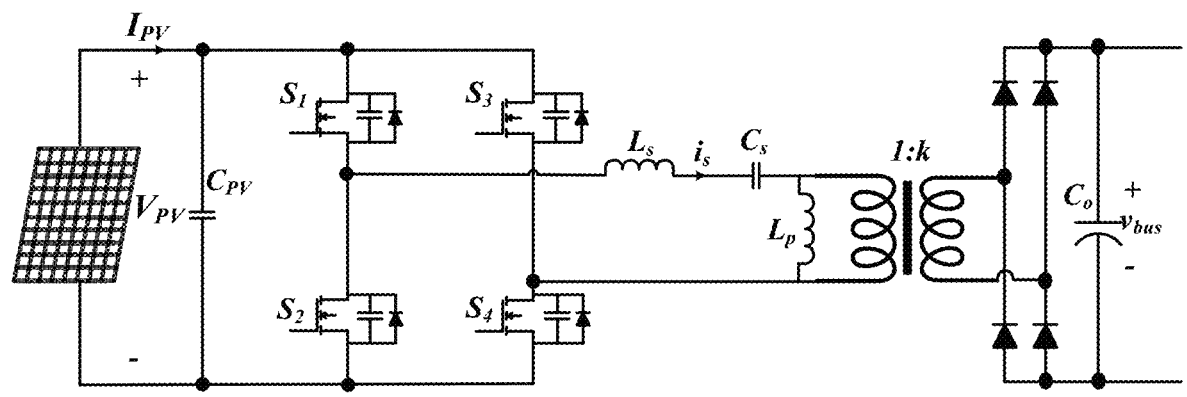
Figure 7:
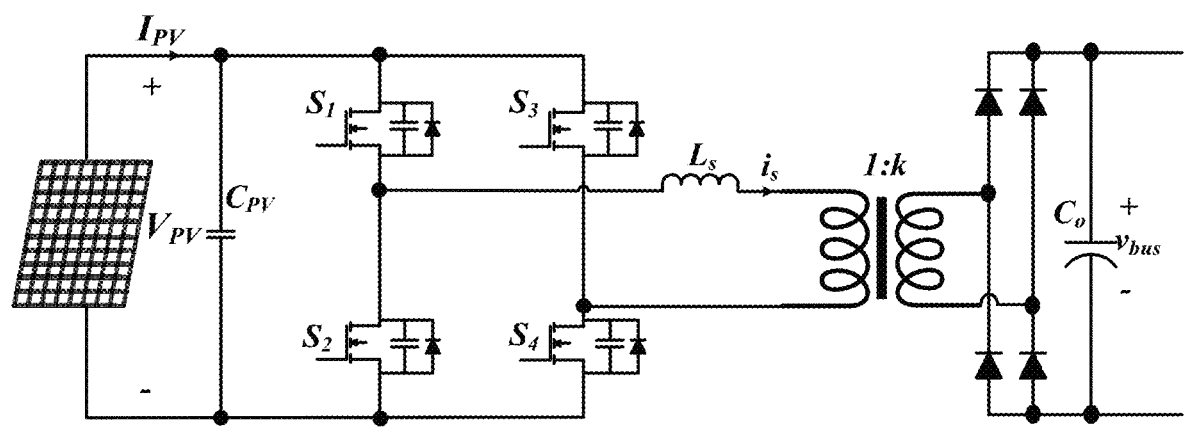
Figure 8:
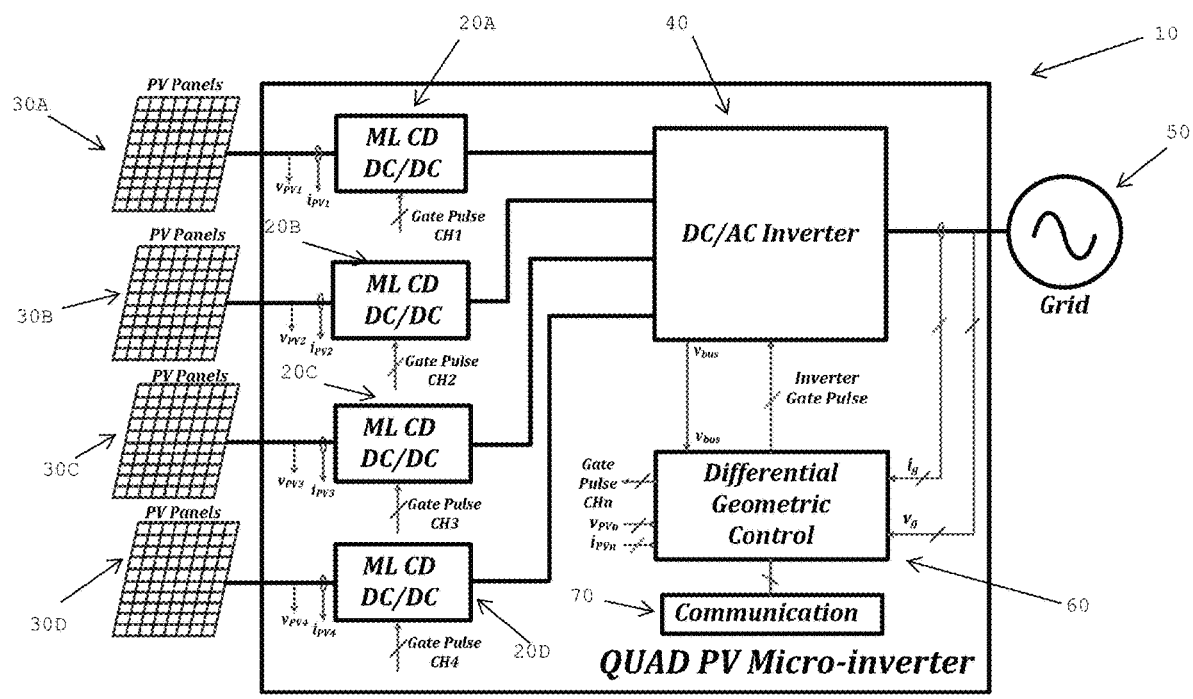
FIG. 8 is a block diagram of a microinverter according to one aspect of the present invention.

Referring to FIG. 8, illustrated is a block diagram of a multi-input PV micro-inverter according to one aspect of the present invention. As can be seen from FIG. 8, the micro-inverter system 10 includes the following blocks:

A number of Multi-Level (ML) Current-Driven (CD) DC/DC Converters 20A, 20B, 20C, 20D. These converters perform maximum power point tracking (MPPT) for the PV panels 30A, 30B, 30C, 30D, while also providing galvanic isolation and voltage boosting;

A DC/AC Inverter 40 for converting the DC power from the converters 20A-20D into AC power compatible with a utility grid 50 and local loads;

A Control System 60 for controlling the DC/DC converters 20A-20D as well as the DC/AC inverter 40. The control system 60 controls these components to achieve control tasks such as MPPT, controlling the power quality at the grid side, etc. (It should be clear that each of the DC/DC converters may be controlled independently of each other and independently of the inverter. Similarly, the control of the DC/DC converters may be coordinated among the different controllers for the converters and for the inverter); and A Communication System 70 for communicating between the micro-inverter and external equipment.

Figure 9A:
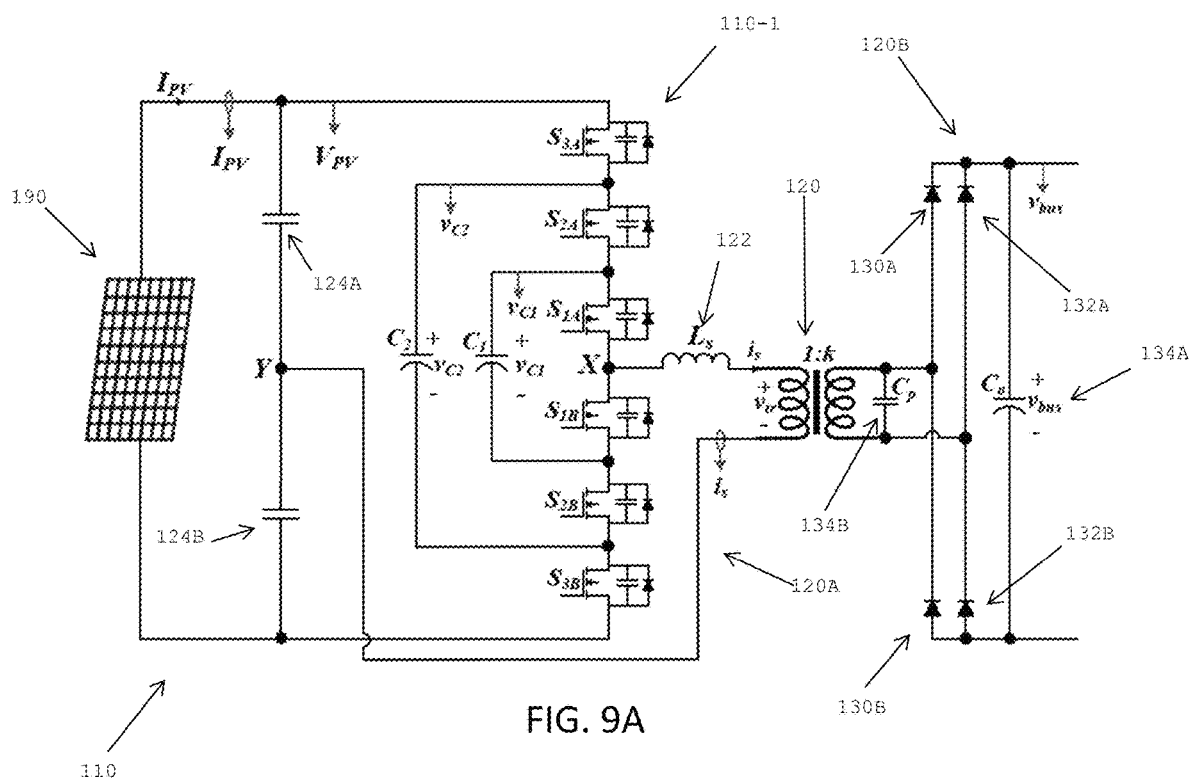
FIGS. 9A and 9B illustrate a half-bridge multi-level current driven DC/DC converter according to another aspect of the present invention.
Figure 9B:
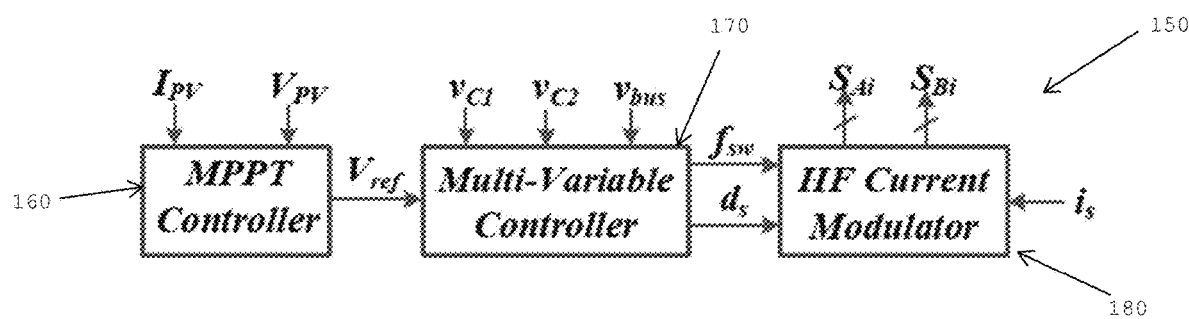

Referring to FIG. 9A and FIG. 9B, illustrated are a power circuit (FIG. 9A) and a control circuit (FIG. 9B) for the Multi-level Current Driven DC/DC Converter according to one aspect of the present invention. The power circuit shown in FIG. 9A is a multi-level half-bridge current-driven DC/DC converter. While the circuit in FIG. 9A is a three-level circuit, it can be extended to an arbitrary number of levels. The multi-level half-bridge current-driven DC/DC converter includes the following blocks:

A power circuit 110, which includes power semiconductors and passive components such as magnetics and capacitors. The power circuit 110 converts the incoming DC voltage at the PV side into a high frequency multilevel AC voltage waveform. Then, the high frequency multi-level AC voltage is used to create high frequency current pulses. These current pulses, in turn, drive the rectifier. The rectifier feeds the capacitive filter that produces a smooth DC voltage at the output of the DC/DC converter;

A digital control system 150, which includes an MPPT controller block 160, a multi-variable controller block 170, and a high frequency (HF) current modulator block 180. The digital control system 150 generates the appropriate gate pulses for the power semiconductors such that various control tasks (including MPPT of the PV panel 190) are performed.

Referring to FIG. 9A, it can be seen that the power circuit 110 includes a transformer 120. The transformer 120 includes a primary side 120A and a secondary side 120B. The primary side 120A includes an input inductor 122, input capacitors 124A, 124B, flying capacitors $C_1$, $C_2$, and a number of circuit element modules. As can be seen from FIG. 9A, the converter power circuit 110 includes a number of circuit element modules and a number of flying capacitors, with each circuit element module including a semiconductor, a diode, and a capacitor. For each circuit element module, the diode and capacitor are coupled in parallel with the semiconductor. Most of the circuit element modules are paired with one another. The paired circuit element modules are coupled as a single chain 110-1 in a series configuration with each pair of circuit element modules being associated with a specific flying capacitor. The associated flying capacitor is coupled to be in parallel with the pair of circuit element modules that the flying capacitor is associated with. Thus, a flying capacitor is coupled between a first and a second coupling point on the chain and the pair of circuit element modules that is associated with the flying capacitor is coupled in series (to each other or to other modules) between the first and second coupling points. As can be seen, other circuit element modules may also be between those first and second coupling points. The flying capacitors associated with which each pair of circuit element modules are detailed in the table below:

| Flying capacitor | First circuit element module in the pair | Second circuit element module in the pair |
|---|---|---|
| $C_1$ | $S_{1A}$ | $S_{1B}$ |
| $C_2$ | $S_{2A}$ | $S_{2B}$ |

It should be clear from the Figure that a third pair of circuit element modules, with modules $S_{3A}$ and $S_{3B}$, are at the ends of this chain of modules 110-1.

Again referring to FIG. 9A, in parallel with the chain 110-1 of circuit element modules are two output capacitors 124A, 124B coupled in series with each other. Midway along the chain 110-1 of modules is the input inductor 122. The input inductor 122 is coupled between the midpoint of chain 110-1 and one lead of transformer 120. The other lead of transformer 120 is coupled to a coupling point between input capacitors 124A, 124B. As can be seen, the PV panel 190 is coupled in parallel to the series coupled input capacitors 124A, 124B and the chain 110-1.

On the secondary side 120B of the transformer 120, there is a first pair of output diodes 130A, 130B, a second pair of output diodes 132A, 132B, and two output capacitors 134A, 134B. Each of the diodes that make up the first pair of output diodes is coupled in series to each other and the second pair of output diodes is similarly coupled in series to each other. Then, the first pair of output diodes is coupled in parallel to the second pair of output diodes while the first output capacitor is coupled in parallel to both pairs of output diodes. The first lead of the secondary side of the transformer is coupled to a coupling point between the first pair of output diodes. The second lead of the secondary side of the transformer is coupled to a coupling point that is between the second pair of output diodes. The second output capacitor is coupled between the first and second leads of the secondary side of the transformer.

Referring to FIG. 9B, as can be seen, the digital control system 150 includes MPPT controller block 160. The MPPT block 160 receives the current and voltage readings from the PV panel 190. A reference voltage $V_{ref}$ is produced by the MPPT block 160 and this voltage is received by the multi-variable controller block 170. In addition to this, the multi-variable controller block 170 also receives the flying capacitor voltages as well as the output voltage ($v_{bus}$) of the converter 100. A switching frequency value $f_{sw}$ and a switch duration ds a,e produced by the multivariable controller block 170. These values are received by the high frequency (HF) current modulator block 180. The current modulator block 180 also receives the current from the primary side of the transformer 120. The current modulator block 180 then produces the switching pulses ($S_{Ai}$, $S_{Bi}$) that control the power semiconductors in the power circuit.

Figure 10:
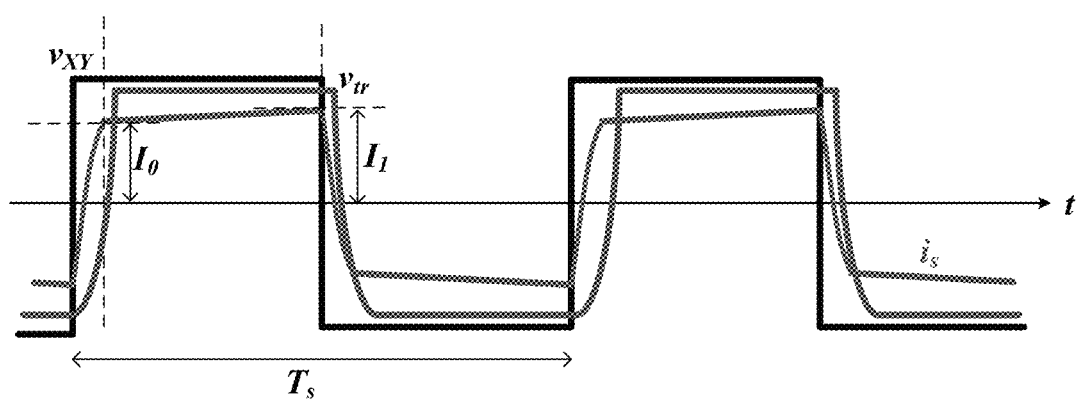
FIG. 10 illustrate typical waveforms for the DC/DC converter illustrated in FIGS. 9A and 9B.

Referring to FIG. 10, illustrated are typical waveforms for the multi-level half-bridge current-driven DC/DC converter according to one aspect of the present invention. As can be seen from the Figure, the current waveform is close to a square-wave. As is known, a square wave is the optimal case for minimising the rms currents and, in turn, conduction losses. The multi-level structure of the converter according to one aspect of the present invention can effectively handle the large range of voltage variations at the PV side (primary side) as well as the range of voltage variations at the output side (secondary side with the DC-bus). Thus, the converter of the present invention can offer high performance for a large range of operating conditions when used in microinverters.

Figure 11:
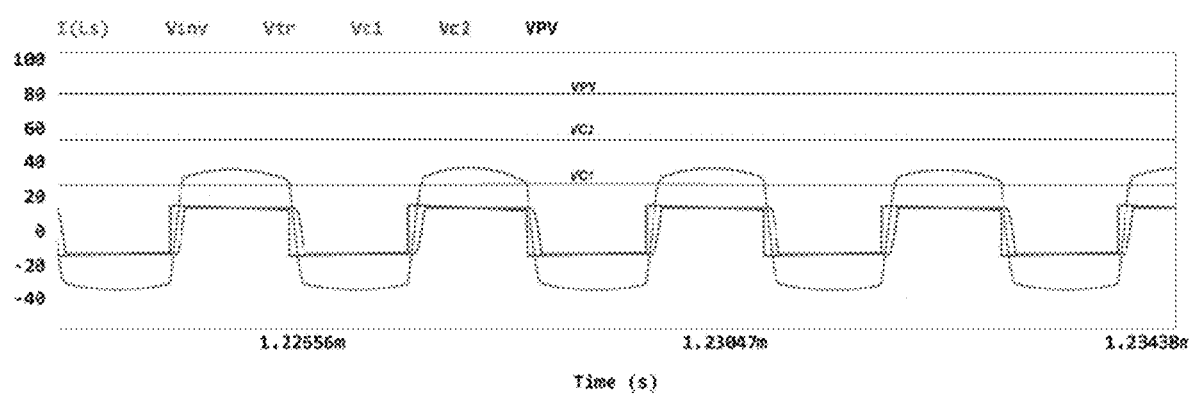
FIGS. 11 and 12 show exemplary waveforms for the converter illustrated in FIGS. 9A and 9B for different PV voltages.
Figure 12:
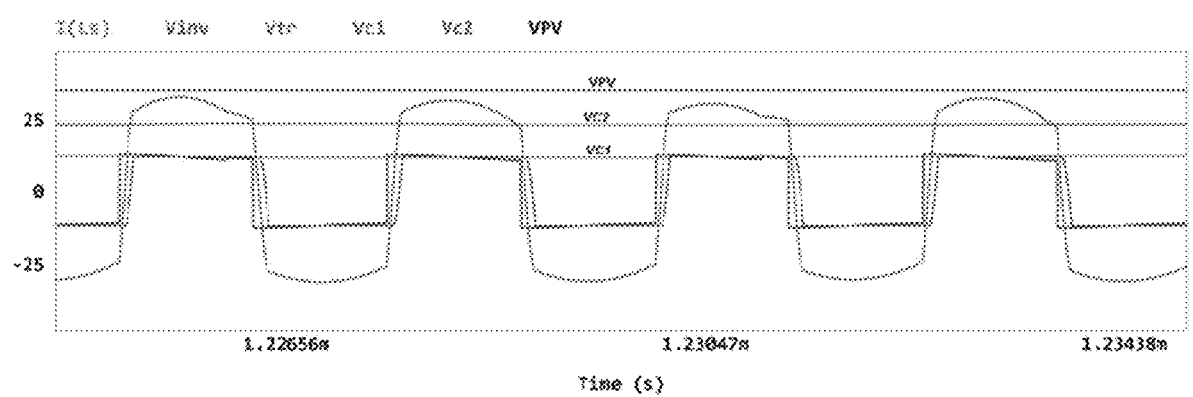

Referring to FIG. 11 and FIG. 12, the waveforms in these figures are exemplary key waveforms for the converter of the present invention for different PV voltages. As can be seen from these figures, the multi-level structure of the converter can be used to provide a wide range of gains for the converter and, accordingly, can achieve high performance.

Figure 13B:
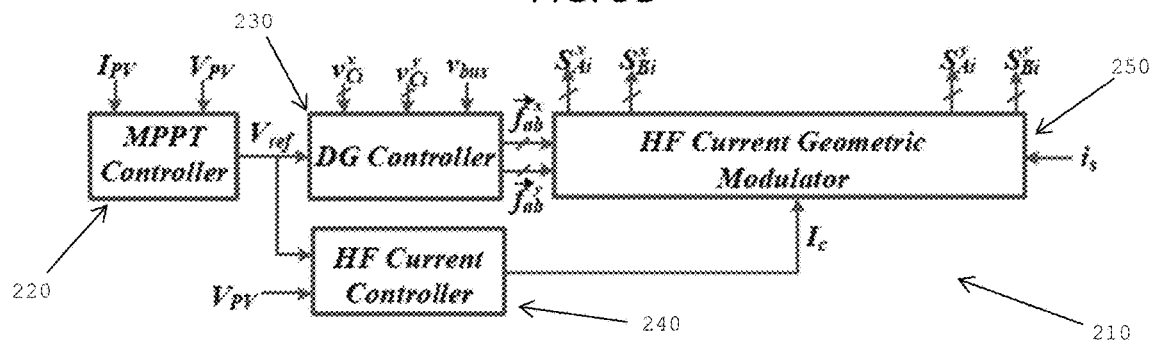
FIGS. 13A and 13B illustrate a full-bridge multi-level current driven DC/DC converter according to yet another aspect of the present invention.
Figure 13A:
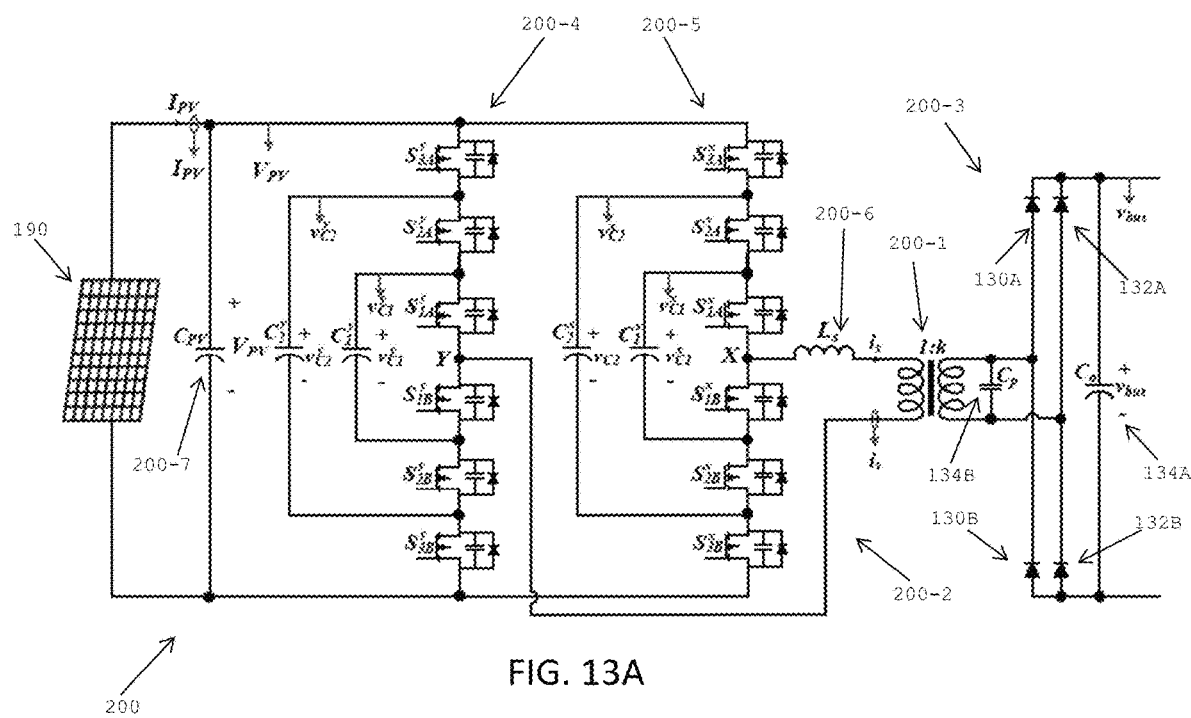

Referring to FIG. 13A and FIG. 13B, illustrated are the power circuit (FIG. 13A) and a controller (FIG. 13B) for another version of a multi-level, current driven DC/DC Converter. This power circuit 200 is a multi-level full-bridge current-driven DC/DC converter. Although the circuit is shown for a three-level configuration, it can be extended to an arbitrary number of levels. The multi-level full-bridge current-driven DC/DC converter includes the following blocks:

A power circuit 200, which includes power semiconductors and passive components such as magnetics and capacitors. The power circuit 200 converts the incoming DC voltage at the PV side to a high frequency multi-level AC voltage waveform. Then, the high frequency multi-level AC voltage is used to create high frequency current pulses. These pulses, in turn, drive the rectifier. The rectifier feeds the capacitive filter that produces a smooth DC voltage at the output of the DC/DC converter;

A digital control system 210 that includes an MPPT controller block 220, a Differential Geometric (DG) controller block 230, a high frequency (HF) current controller block 240, and an HF current geometric modulator block 250. The digital control system generates the appropriate gate pulses for the power semiconductors in the power circuit such that various control tasks, such as MPPT of the PV panel, are performed.

Referring to FIG. 13A, the power circuit 200 includes a transformer 200-1 that has a primary side 200-2 and a secondary side 200-3. On the primary side 200-2 of the transformer 200-1, it can be seen that, instead of a single chain of circuit element modules, there are two chains 200-4, 200-5. Each chain of circuit element modules has a single chain of series coupled circuit element modules, with each circuit element module being paired with another circuit element module. For each pair of paired circuit modules, there is associated a specific flying capacitor and each specific flying capacitor is coupled in parallel to its associated pair of modules. Thus, each flying capacitor is coupled between a first and a second coupling point on the chain and the pair of circuit element modules that is associated with that flying capacitor is coupled in series (to each other or to other modules) between the first and second coupling points. As can be seen, other circuit element modules may also be between those first and second coupling points. The flying capacitors associated with which each pair of circuit element modules on the first chain of modules 200-4 (the chain of modules on the left) are detailed in the table below:

| Flying capacitor | First circuit element module in the pair | Second circuit element module in the pair |
|---|---|---|
| $C^y_1$ | $S^y_{1A}$ | $S^y_{1B}$ |
| $C^y_2$ | $S^y_{2A}$ | $S^y_{2B}$ |

It should be clear from the Figure that a third pair of circuit element modules, with modules $S^Y_{3A}$ and $S^Y_{3B}$, are at the ends of this first chain of modules.

For the second chain of modules 200-5 (the chain of modules on the right), the flying capacitors associated with which each pair of circuit element modules are detailed in the table below:

| Flying capacitor | First circuit element module in the pair | Second circuit element module in the pair |
|---|---|---|
| $C^x_1$ | $S^x_{1A}$ | $S^x_{1B}$ |
| $C^x_2$ | $S^x_{2A}$ | $S^x_{2B}$ |

It should be clear from the Figure that a third pair of circuit element modules, with modules $S^x_{3A}$ and $S^x_{3B}$, are at the ends of this second chain of modules.

Also on the primary side 200-2 of the transformer 200-1 are input inductor 200-6 and input capacitor 200-7. The input inductor 200-6 is coupled between a midpoint of the second chain of modules 200-5 and one lead from the primary side of transformer 200-1. The other lead from the primary side of transformer 200-1 is coupled to a midpoint of the first chain of modules 200-4. The input capacitor 200-7 is coupled in parallel to the two chains of modules 200-4, 200-5. This input capacitor 200-7 is also coupled in parallel to the PV panel 190.

On the secondary side 200-3 of the transformer 200, the configuration is the same as that for the secondary side in the power circuit of FIG. 9A. There is a first pair of output diodes 130A, 130B, a second pair of output diodes 132A, 132B, and two output capacitors 134A, 134B. Each of the diodes that make up the first pair of output diodes is coupled in series to each other and the second pair of output diodes is similar coupled in series to each other. Then, the first pair of output diodes is coupled in parallel to the second pair of output diodes while the first output capacitor 134A is coupled in parallel to both pairs of output diodes. The first lead of the secondary side 200-3 of the transformer 200 is coupled to a coupling point between the first pair of output diodes. The second lead of the secondary side of the transformer is coupled to a coupling point that is between the second pair of output diodes. The second output capacitor 134B is coupled between the first and second leads of the secondary side 200-3 of the transformer 200.

Referring to FIG. 13B, illustrated are the components of the digital control system 210. As can be seen, the MPPT controller block 220 receives the voltage ($V_{PV}$) and current ($I_{PV}$) values for the PV panel 190. The MPPT controller block 220 produces a reference voltage ($V_{ref}$) that is received by the differential geometric (DG) controller block 230. This controller block 230 also receives the flying capacitor voltages ($v^x_{Ci}$, $v^y_{Ci}$) and the output voltage ($v_{bus}$) for the converter while producing desired vectors ($\vec{f}^x_{ab}$, $\vec{f}^y_{ab}$) for the geometric modulator 250. The reference voltage ($V_{ref}$) is also received by the High Frequency (HF) Current Controller block 240. This controller block 240 also receives the PV voltage ($V_{PV}$) while producing a threshold current ($I_s$) signal. The High Frequency (HF) Current Geometric Modulator 250 receives the desired vectors ($\vec{f}^x_{ab}$, $\vec{f}^y_{ab}$), the threshold current ($I_c$) signal, and a high frequency transformer current ($i_s$). The modulator 250 also produces the gate pulses ($S^x_{Ai}$, $S^x_{Bi}$, $S^y_{Ai}$, $S^y_{Bi}$) that control the semiconductors in the power circuit.

Figure 14:
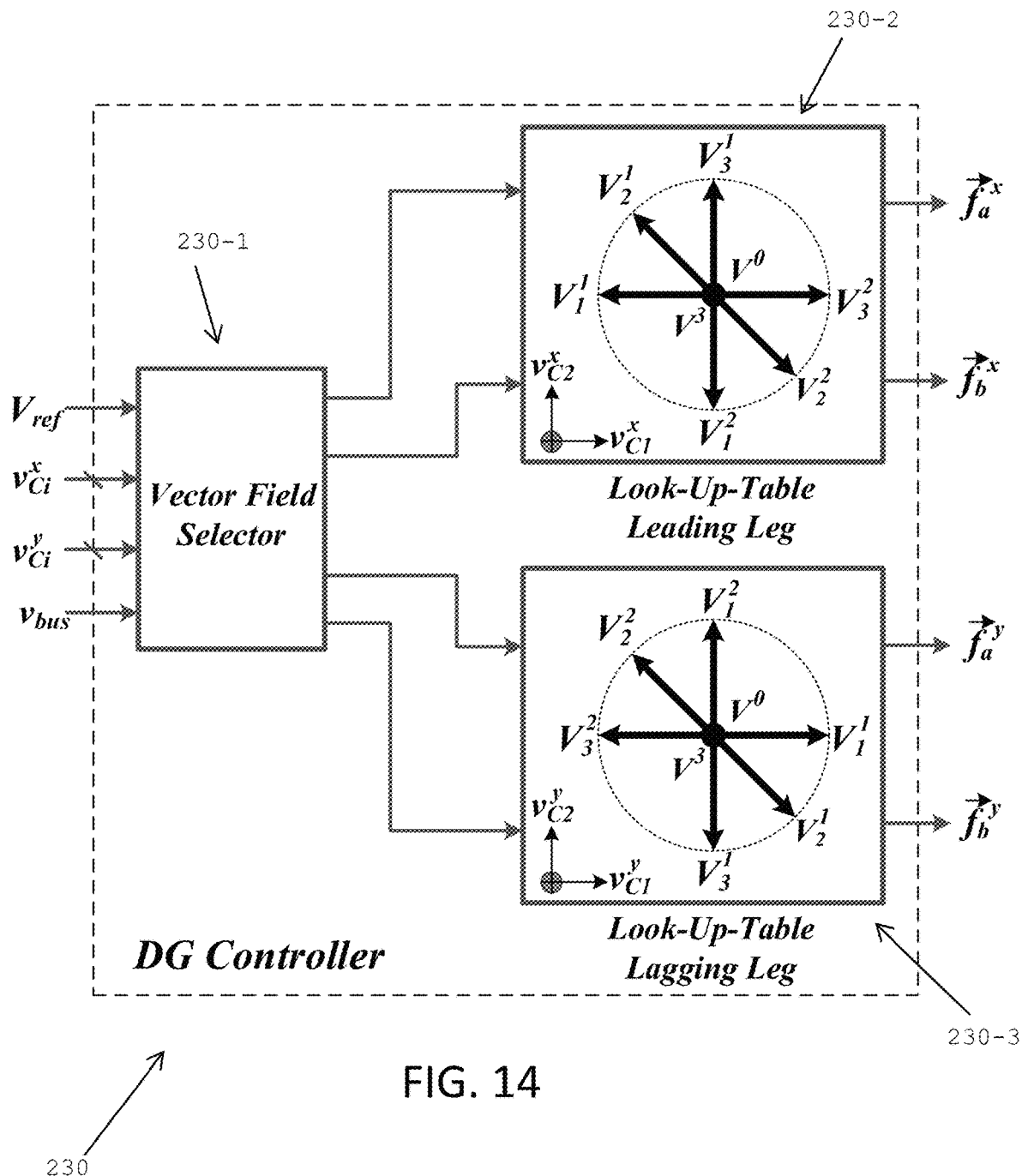
FIG. 14 shows a block diagram of a DG controller block as used in the DC/DC converter illustrated in FIGS. 13A and 13B.

Referring to FIG. 14, illustrated is a block diagram of the DG controller block 230. The DG controller block 230 receives the reference value, $V_{ref}$, for the relevant input voltage (i.e., the relevant PV voltage), the flying capacitors' voltages, $v^x_{Ci}$ and $v^y_{Ci}$ (i=1, . . . , n), and the output (DC bus) voltage, $v_{bus}$. The DG controller block 230 generates the switching vectors, $\vec{f}^x_a$ and $\vec{f}^x_b$, for the leading leg (the leading leg includes power semiconductors and $S^x_{iA}$ and $S^x_{iB}$) and $\vec{f}^y_a$ and $\vec{f}^y_b$, for the lagging leg (the lagging leg includes power semiconductors $S^y_{iA}$ and $S^y_{iB}$). The DG controller 230 includes the following blocks:

A vector field selector block 230-1 that receives the reference value, $V_{ref}$, the flying capacitors' voltages, $v^x_{Ci}$ and $v^y_{Ci}$ (i=1, . . . , n), and the DC-bus voltage, $v_{bus}$, and enables the appropriate vector fields;

A vector field look-up-table 230-2 for the leading leg and which generates the switching vectors, $\vec{f}^x_a$ and $\vec{f}^x_b$, for the leading leg, A vector field look-up-table 230-3 for the lagging leg and which generates the switching vectors, $\vec{f}^y_a$ and $\vec{f}^y_b$, for the lagging leg.

It should be clear that, in some implementations, the look-up tables can be replaced by one or more suitably programmed data processors. Such data processors can calculate the relevant switching vectors based on the inputs to the DG controller block 230.

Figure 15:
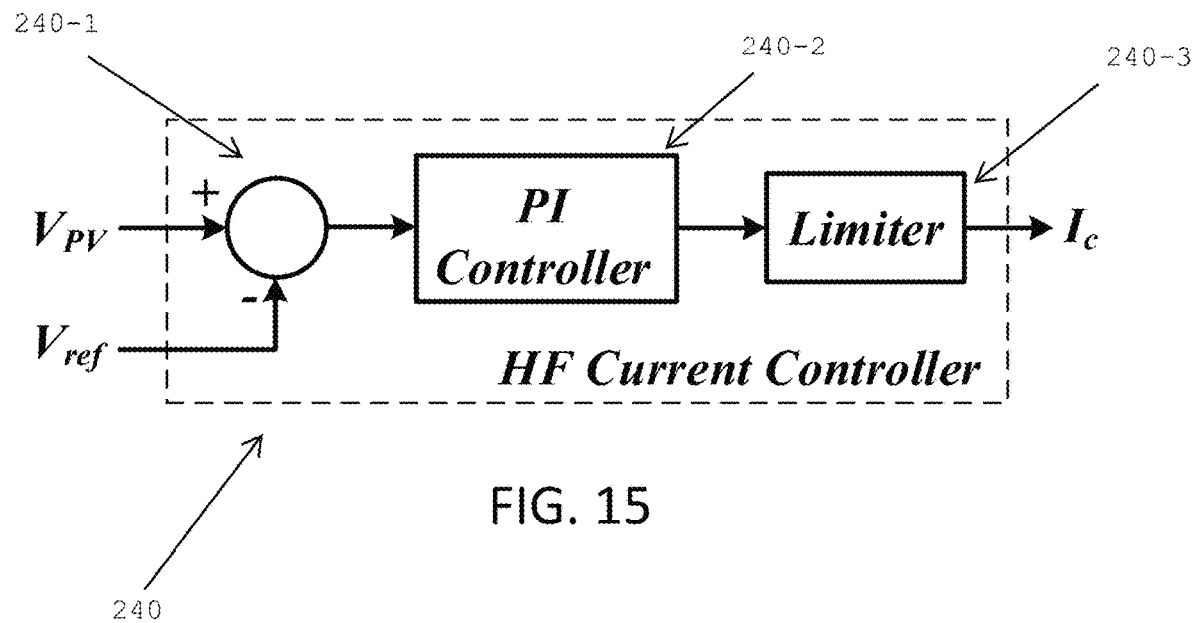
FIG. 15 illustrates a block diagram of the HF current controller block as used in the DC/DC converter illustrated in FIGS. 13A and 13B.

Referring to FIG. 15, illustrated is a block diagram for the HF current controller block 240. This block receives the reference value, $V_{ref}$, and the PV voltage ($V_{PV}$), and produces the current threshold $I_c$ for the HF current geometric modulator block 250. This block 240 includes a subtractor 240-1 which calculates the error between the PV voltage and its reference value. The resulting difference is applied to a PI (proportional-integral) controller 240-2. The output of the PI controller 240-2 is received by a limiter 240-3 to limit the values of the output threshold current $I_c$.

Figure 16:
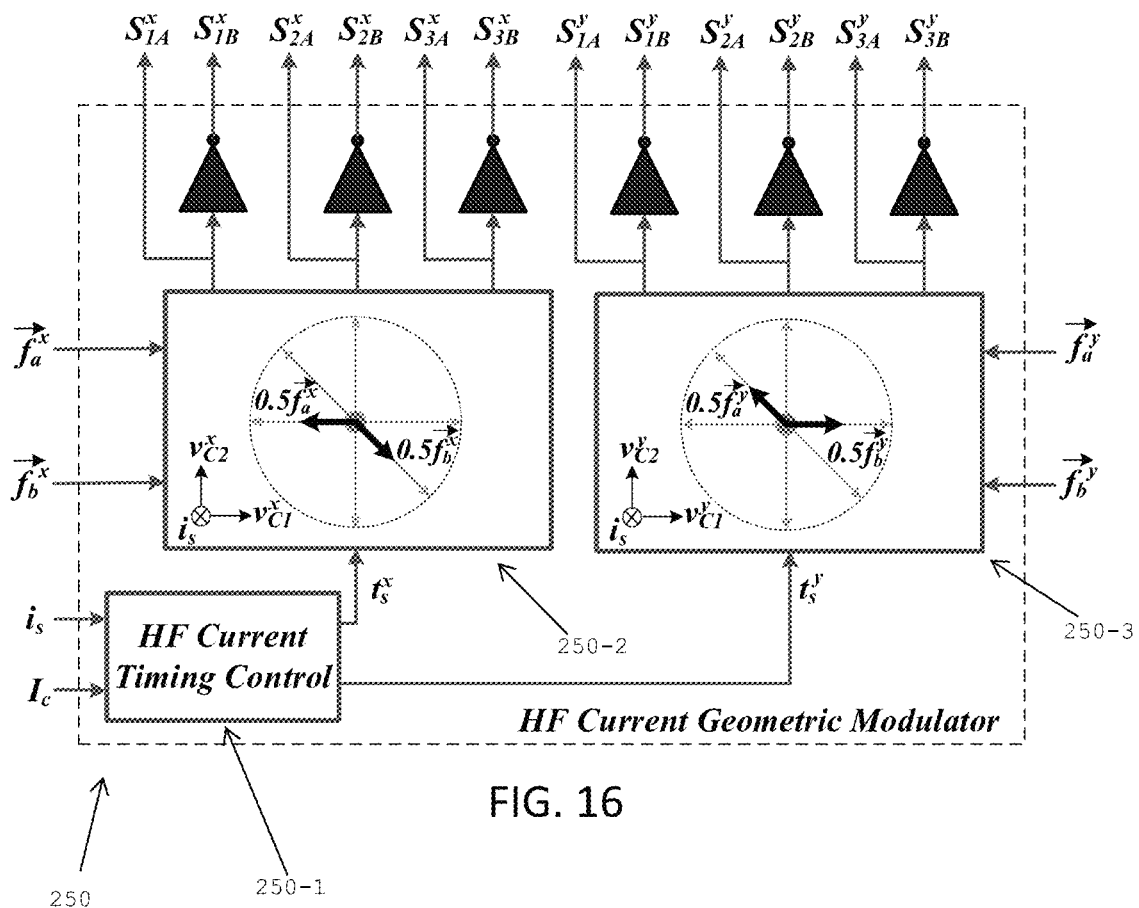
FIG. 16 shows a block diagram of an HF current geometric modulator as detailed in the DC/DC converter shown in FIGS. 13A and 13B.

Referring to FIG. 16, shown is a block diagram for the HF Current Geometric Modulator 250 as used in the multi-level full-bridge current-driven DC/DC converter according to one aspect of the present invention. This block 250 receives the switching vectors, $\vec{f}_a^x$ and $\vec{f}_b^x$, for the leading leg and $\vec{f}_a^y$ and $\vec{f}_b^y$, for the lagging leg. This block 250 also receives the high frequency transformer current, $i_s$, and the threshold current $I_c$, and generates the gate pulses for the leading leg and lagging leg power semiconductors ($S_{iA}^x$, $S_{iB}^x$, $S_{iA}^y$, and $s_{iB}^y$). As can be seen from FIG. 16, the HF Current Geometric Modulator 250 includes an HF current timing control block 250-1, which determines the durations ($t_s^x$ and $t_s^y$) of the switching vectors (i.e., $\vec{f}_a^x$, $\vec{f}_b^x$, $\vec{f}_a^y$, and $\vec{f}_b^y$) based on the high frequency transformer current, is, and the threshold current $I_c$. Gate pulse generators 250-2, 250-3 generate the gate pulses for the semiconductors in the chains of circuit element modules. As can be seen from FIG. 16, each of the gate pulse generators 250-2, 250-3 generates these gate pulses based on the input switching vectors and the durations. Each gate pulse generator generates two gate pulses per pair of paired circuit element modules with one gate pulse being the opposite of the other. As an example, the gate pulse for semiconductor $S^x_{1A}$ is always the opposite of the gate pulse for semiconductor $S^x_{1B}$.

Figure 17:
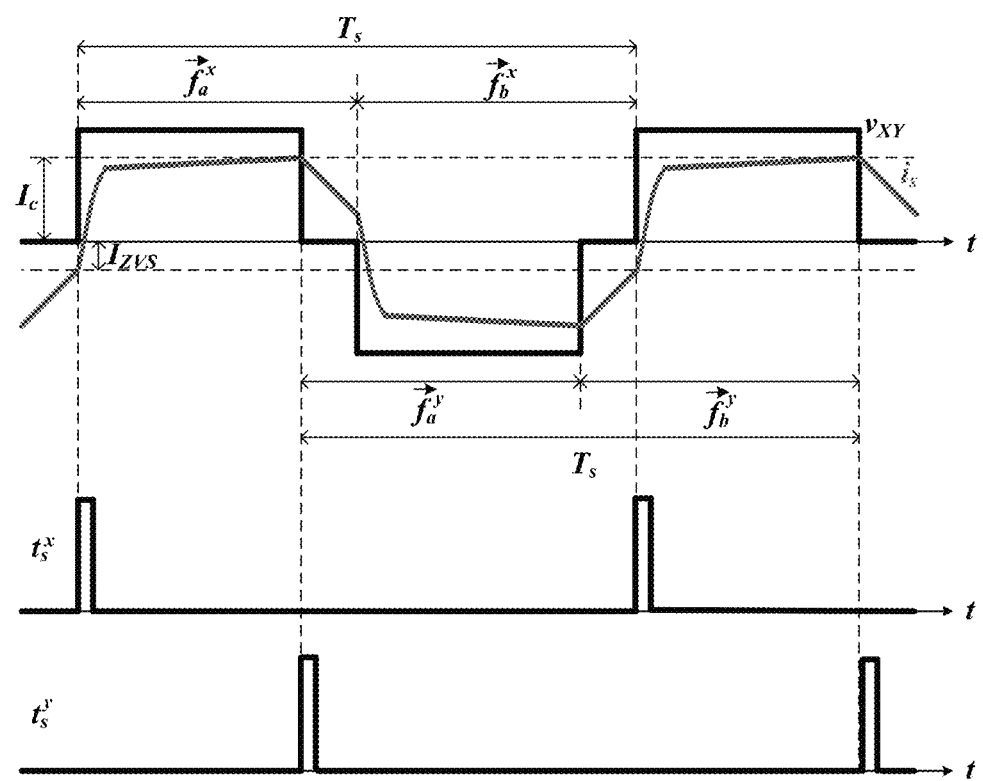
FIG. 17 are waveforms and timing diagrams illustrating how the HF current geometric modulator operates to generate the timing signals.

Referring to FIG. 17, illustrated are waveform diagrams that detail how the HF Current Geometric Modulator 250 operates by generating the timing signals. As can be seen, the pulses of $t_s^x$ and $t_s^y$ are based on the incoming value of $I_c$. The appropriate selection of the switching vectors depends on the input and output voltages of the DC/DC converter.

Figure 18:
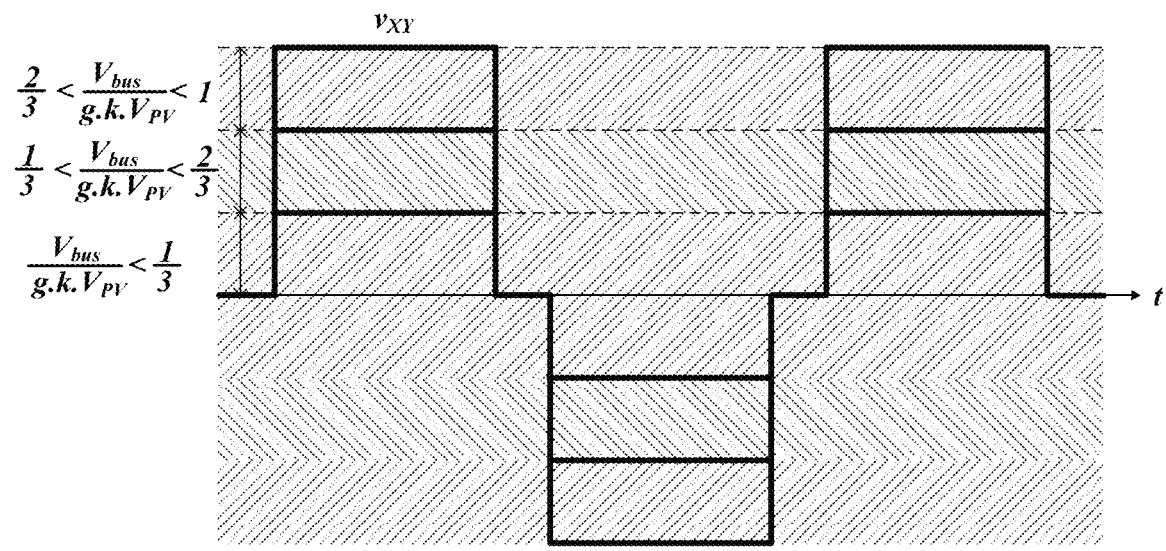
FIG. 18 illustrate the selection of appropriate structures to achieve certain voltage levels for the output voltage for the DC/DC converter illustrated in FIGS. 13A and 13B.

Referring to FIG. 18, shown are diagrams that detail how to select appropriate structures to achieve certain voltage levels for the high frequency output voltage of the bridge converter. The level is selected based on the input output voltages and the gain of the converter as denoted by g.

Figure 19:
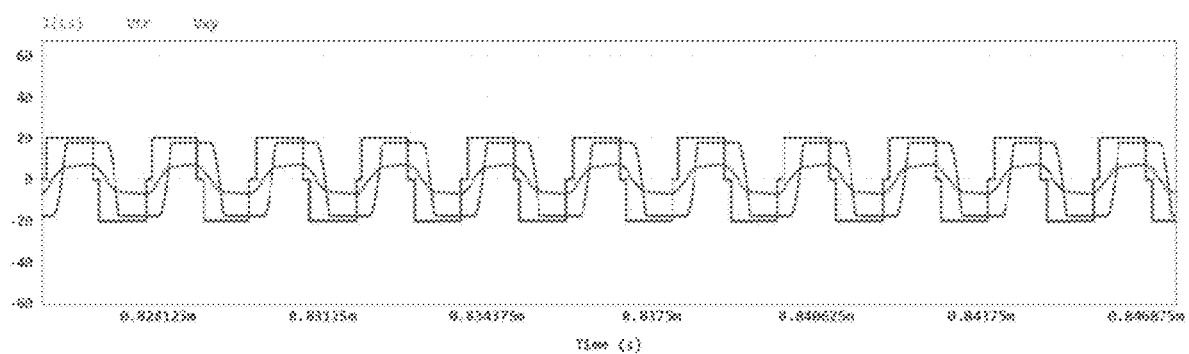
FIGS. 19-21 are simulation waveforms for various PV voltages for the DC/DC converter illustrated in FIGS. 13A and 13B.
Figure 20:
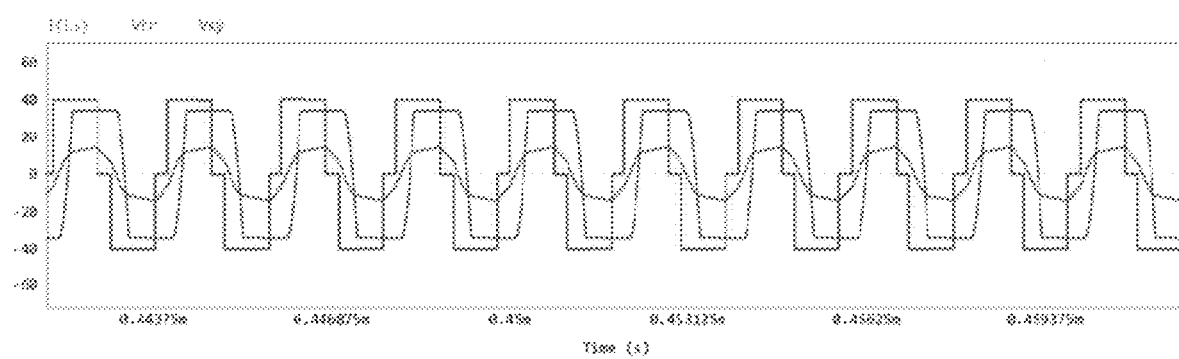
Figure 21:
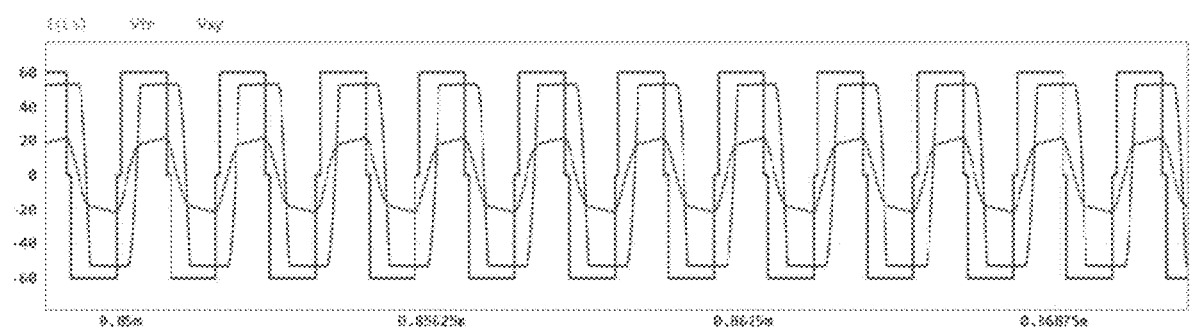

Simulation waveforms for the multi-level full-bridge current-driven DC/DC converter at different PV voltages are shown in FIG. 19, FIG. 20, and FIG. 21. FIG. 19 shows the key waveforms for low PV voltages while FIG. 20 shows the key waveforms for medium PV voltage. FIG. 21 shows the key waveforms for a high PV voltage.

A person understanding this invention may now conceive of alternative structures and embodiments or variations of the above all of which are intended to fall within the scope of the invention as defined in the claims that follow.

We claim:

1. A microinverter system for receiving input DC power and for producing AC power suitable for an AC power grid, the system comprising:
   a plurality of multi-level current driven DC/DC converters, each of said plurality of DC/DC converters receiving said input DC power from DC power sources;
   a DC/AC inverter receiving outputs of said plurality of DC/DC converters and producing said AC power, an output of said DC/AC inverter being received by said AC power grid; and
   a differential geometric control system for controlling said DC/AC inverter and for controlling said plurality of DC/DC converters,
wherein said control system controls each of said plurality of DC/DC converters to perform maximum power point tracking to extract maximum input DC power from said DC power sources.

2. The microinverter system according to claim 1, wherein at least one of said plurality of DC/DC converters comprises:
   a transformer having a primary side and a secondary side, said primary side of said transformer receiving an input current, said secondary side of said transformer producing an output current;
   a plurality of pairs of circuit element modules, each of said circuit element modules comprising a semiconductor;
   a plurality of flying capacitors, each of said plurality of flying capacitors being associated with a specific pair of circuit element modules;
   a pair of input capacitors coupled in series to each other;
   an input inductor;
   two pairs of diodes, each pair of diodes being coupled in series; and
   a first output capacitor and a second output capacitor, wherein
   each of said plurality of circuit element modules is coupled in series to other circuit element modules to form a chain of circuit element modules; and
   each flying capacitor is coupled between a first coupling point and a second coupling point in said chain of circuit element modules and each flying capacitor and each pair of circuit element modules are arranged in said chain such that for each specific flying capacitor, a specific pair of circuit element modules associated with said specific flying capacitor is coupled in said chain between a specific first coupling point and a specific second coupling point between which said specific flying capacitor is coupled;
   and wherein
   on said primary side of said transformer, said DC/DC converter comprises:
      said pair of input capacitors being coupled in parallel to said chain;
      said input inductor is coupled between a first end of said transformer primary side and a first coupling point that is in a middle of said chain;
      a second end of said transformer primary side is coupled to a second coupling point that is between said pair of input capacitors;
      an input is coupled in parallel to said pair of input capacitors; and
   on said secondary side of said transformer, said DC/DC converter comprises:
      said first output capacitor being coupled between a first end of said transformer secondary side and a second end of said transformer secondary side;
      said two pairs of diodes being coupled in parallel to each other;
      said second output capacitor being coupled in parallel with said two pairs of diodes;
      said first end of said transformer secondary side being coupled to a first output coupling point that is between said first pair of diodes; and
      said second end of said transformer secondary side being coupled to a second output coupling point that is between said second pair of diodes.

3. The microinverter system according to claim 2, wherein said at least one of said plurality of DC/DC converters is controlled by a control system comprising:
   an MDPT controller for implementing maximum power point tracking on said converter and for producing a reference voltage;
   a multivariable controller for receiving said reference voltage, flying capacitor voltages from said plurality of flying capacitors, and an output voltage of said converter, said multivariable controller producing switching frequency values and duration values for said switching frequency values; and a high frequency (HF) current modulator receiving said switching frequency values, said duration values, and a transformer current for said transformer, said current modulator producing switching pulses for semiconductors in said plurality of circuit element modules.

4. The microinverter system according to claim 1, wherein at least one of said plurality of DC/DC converters comprises:

a transformer having a primary side and a secondary side, said primary side of said transformer receiving an input current, said secondary side of said transformer producing an output current;

a plurality of pairs of circuit element modules, each of said circuit element modules comprising a semiconductor; a plurality of flying capacitors, each of said plurality of flying capacitors being associated with a specific pair of circuit element modules;

an input capacitor;

an input inductor;

two pairs of diodes, each pair of diodes being coupled in series; and a first output capacitor and a second output capacitor, wherein each of said plurality of circuit element modules is coupled in series to other circuit element modules to form a first chain of circuit element modules and a second chain of circuit element modules, said first chain being coupled in parallel with said second chain; and for both of said first chain and said second chain, each flying capacitor is coupled between a first coupling point and a second coupling point in said first or second chain of circuit element modules and each flying capacitor and each pair of circuit element modules are arranged in said first chain or said second chain such that for each specific flying capacitor, a specific pair of circuit element modules associated with said specific flying capacitor is coupled in said first chain or said second chain between a specific first coupling point and a specific second coupling point between which said specific flying capacitor is coupled, wherein, on said primary side of said transformer, said DC/DC converter comprises:

said first chain of circuit element modules and said second chain of circuit element modules;

said input capacitor being coupled in parallel with both of said first chain and said second chain;

said input inductor being coupled between a first end of said transformer primary side and a first coupling point that is in a middle of said first chain; and a second end of said transformer primary side being coupled to a second coupling point that is in a middle of said second chain, and wherein, on said secondary side of said transformer, said DC/DC converter comprises:

said two pairs of diodes;

said first output capacitor and said second output capacitor, said first output capacitor being coupled between a first end of said transformer secondary side and a second end of said transformer secondary side and said second output capacitor being coupled in parallel with said two pairs of diodes;

said first end of said transformer secondary side being coupled to a first output coupling point that is between said first pair of diodes; and said second end of said transformer secondary side being coupled to a second output coupling point that is between said second pair of diodes.

5. The microinverter system according to claim 4, wherein said at least one of said plurality of DC/DC converters is controlled by a control system comprising:

an MDPT controller for implementing maximum power point tracking on said converter and for producing a reference voltage;

a differential geometric controller block for receiving said reference voltage, flying capacitor voltages from said plurality of flying capacitors, and an output voltage of said converter, said differential geometric controller block producing desired vectors based on said reference voltage, said flying capacitor voltages, and said output voltage;

a high frequency (HF) current controller for receiving said reference voltage and an input voltage and for producing a threshold current signal; and a high frequency current geometric modulator for receiving said desired vectors, said threshold current signal, and a transformer current, said current geometric modulator producing switching pulses for semiconductors in said plurality of circuit element modules.

6. A DC/DC converter comprising:

a transformer having a primary side and a secondary side, said primary side of said transformer receiving an input current, said secondary side of said transformer producing an output current;

a plurality of pairs of circuit element modules, each of said circuit element modules comprising a semiconductor;

a plurality of flying capacitors, each of said plurality of flying capacitors being associated with a specific pair of circuit element modules;

a pair of input capacitors coupled in series to each other;

an input inductor;

two pairs of diodes, each pair of diodes being coupled in series; and a first output capacitor and a second output capacitor, wherein each of said plurality of circuit element modules is coupled in series to other circuit element modules to form a chain of circuit element modules; and each flying capacitor is coupled between a first coupling point and a second coupling point in said chain of circuit element modules and each flying capacitor and each pair of circuit element modules are arranged in said chain such that for each specific flying capacitor, a specific pair of circuit element modules associated with said specific flying capacitor is coupled in said chain between a specific first coupling point and a specific second coupling point between which said specific flying capacitor is coupled;

and wherein on said primary side of said transformer, said DC/DC converter comprises:

said pair of input capacitors being coupled in parallel to said chain;

said input inductor being coupled between a first end of said transformer primary side and a first coupling point that is in a middle of said chain;

a second end of said transformer primary side being coupled to a second coupling point that is between said pair of input capacitors an input is coupled in parallel to said pair of input capacitors; and on said secondary side of said transformer, said DC/DC converter comprises:
said first output capacitor being coupled between a first end of said transformer secondary side and a second end of said transformer secondary side;
said two pairs of diodes being coupled in parallel to each other;
said second output capacitor being coupled in parallel with said two pairs of diodes;
said first end of said transformer secondary side being coupled to a first output coupling point that is between said first pair of diodes; and
said second end of said transformer secondary side being coupled to a second output coupling point that is between said second pair of diodes;

wherein said DC/DC converter further comprises a controller for controlling capacitor voltages for said plurality of flying capacitors, the controller comprising:
an MDPT controller for implementing maximum power point tracking on said converter and for producing a reference voltage;
a multivariable controller for receiving said reference voltage, flying capacitor voltages from said plurality of flying capacitors, and an output voltage of said converter, said multivariable controller producing switching frequency values and duration values for said switching frequency values; and
a high frequency (HF) current modulator receiving said switching frequency values, said duration values, and a transformer current for said transformer, said current modulator producing switching pulses for semiconductors in said plurality of circuit element modules.

7. The DC/DC converter according to claim 6, wherein said input current is from a photovoltaic (PV) panel, said PV panel being coupled in parallel to said pair of input capacitors.

8. A current driven DC/DC converter comprising:
a transformer having a primary side and a secondary side, said primary side of said transformer receiving an input current, said secondary side of said transformer producing an output current;
a plurality of pairs of circuit element modules, each of said circuit element modules comprising a semiconductor;
a plurality of flying capacitors, each flying capacitor being associated with a specific pair of circuit element modules;
an input capacitor;
an input inductor;
two pairs of diodes, each pair of diodes being coupled in series; and
a first output capacitor and a second output capacitor,
wherein
each of said plurality of circuit element modules is coupled in series to other circuit element modules to form a first chain of circuit element modules and a second chain of circuit element modules, said first chain being coupled in parallel with said second chain; and
for both of said first chain and said second chain, each flying capacitor is coupled between a first coupling point and a second coupling point in said first or second chain of circuit element modules and each flying capacitor and each pair of circuit element modules are arranged in said first chain or said second chain such that for each specific flying capacitor, a specific pair of circuit element modules associated with said specific flying capacitor is coupled in said first chain or said second chain between a specific first coupling point and a specific second coupling point between which said specific flying capacitor is coupled;

wherein, on said primary side of said transformer, said DC/DC converter comprises:
said first chain of circuit element modules and said second chain of circuit element modules;
said input capacitor being coupled in parallel with both of said first chain and said second chain;
said input inductor being coupled between a first end of said transformer primary side and a first coupling point that is in a middle of said first chain; and
a second end of said transformer primary side being coupled to a second coupling point that is in a middle of said second chain;

and wherein, on said secondary side of said transformer, said DC/DC converter comprises:
said two pairs of diodes;
said first output capacitor and said second output capacitor, said first output capacitor being coupled between a first end of said transformer secondary side and a second end of said transformer secondary side and said second output capacitor being coupled in parallel with said two pairs of diodes;
said first end of said transformer secondary side being coupled to a first output coupling point that is between said first pair of diodes;
and said second end of said transformer secondary side being coupled to a second output coupling point that is between said second pair of diodes;

wherein said DC/DC converter further comprises a controller for controlling capacitor voltages for said plurality of flying capacitors, the controller comprising:
an MPPT controller for implementing maximum power point tracking (MPPT) on said converter and for producing a reference voltage;
a differential geometric controller block for receiving said reference voltage, flying capacitor voltages from said plurality of flying capacitors, and an output voltage of said converter, said differential geometric controller block producing desired vectors based on said reference voltage, said flying capacitor voltages, and said output voltage;
a high frequency (HF) current controller for receiving said reference voltage and an input voltage and for producing a threshold current signal; and
a high frequency current geometric modulator for receiving said desired vectors, said threshold current signal, and a transformer current, said current geometric modulator producing switching pulses for semiconductors in said plurality of circuit element modules.

9. The DC/DC converter according to claim 8, wherein said input current is from a photovoltaic (PV) panel, said PV panel being coupled in parallel to said input capacitor.

10. The DC/DC converter according to claim 8, wherein said differential geometric controller block comprises:
a vector field selector block receiving said reference value, said flying capacitor voltages, and said output voltage, said vector field selector block determining relevant vector fields based on said reference value, said flying capacitor voltages, and said output voltage;
a vector field look-up-table for determining switching vectors for a leading leg based on said relevant vector fields; and a vector field look-up-table for determining switching vectors for a lagging leg based on said relevant vector fields.

11. The DC/DC converter according to claim 8, wherein said differential geometric controller block comprises:
   a vector field selector block receiving said reference value, said flying capacitor voltages, and said output voltage, said vector field selector block determining relevant vector fields based on said reference value, said flying capacitor voltages, and said output voltage;
   at least one processor for calculating switching vectors for a leading leg based on said relevant vector fields; and
   at least one processor for determining switching vectors for a lagging leg based on said relevant vector fields.

12. The DC/DC converter according to claim 8, wherein said high frequency controller block comprises:
   a subtractor block that takes a difference between said input voltage and said reference voltage;
   a proportional-integral (PI) controller receiving said difference; and
   a limiter receiving an output of said PI controller and producing said threshold current signal.

13. The DC/DC converter according to claim 8, wherein said a high frequency current geometric modulator comprises:
   gate pulse generators for generating gate pulses for semiconductors in said circuit element modules; and
   a high frequency current timing control block for determining durations for said gate pulses,
   wherein
   said gate pulse generators receive said switching vectors and said durations and generate said gate pulses based on said switching vectors and said durations.

* * * * *